(12) United States Patent
Shin et al.

(10) Patent No.: US 10,200,445 B2
(45) Date of Patent: Feb. 5, 2019

(54) METHOD FOR ANALYZING PERFORMANCE OF NETWORK APPLICATION PROGRAM IN SOFTWARE DEFINED NETWORKING ENVIRONMENT, APPARATUS THEREFOR, AND COMPUTER PROGRAM THEREFOR

(71) Applicant: Korea Advanced Institute of Science and Technology, Daejeon (KR)

(72) Inventors: Seungwon Shin, Daejeon (KR); Heedo Kang, Daejeon (KR); Seungsoo Lee, Daejeon (KR); Changhoon Yoon, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 85 days.

(21) Appl. No.: 15/496,346

(22) Filed: Apr. 25, 2017

(65) Prior Publication Data

US 2017/0310734 A1 Oct. 26, 2017

(30) Foreign Application Priority Data

Apr. 25, 2016 (KR) .......................... 10-2016-0049900

(51) Int. Cl.
*H04L 29/08* (2006.01)
*H04L 12/24* (2006.01)
(Continued)

(52) U.S. Cl.
CPC .......... *H04L 67/025* (2013.01); *H04L 41/145* (2013.01); *H04L 43/026* (2013.01);
(Continued)

(58) Field of Classification Search
CPC ................................................. H04L 67/1095
See application file for complete search history.

(56) References Cited

U.S. PATENT DOCUMENTS 9,038,151 B1 * 5/2015 Chua ...................... H04L 45/02
709/223
9,197,569 B2 * 11/2015 Li ........................ H04L 47/2441
(Continued)

OTHER PUBLICATIONS

Kreutz, Diego, et al. "Software-defined networking: A comprehensive survey." Proceedings of the IEEE 103.1 (2015): 14-76.*
(Continued)

*Primary Examiner* — Jimmy H Tran
(74) *Attorney, Agent, or Firm* — John V. Daniluck; Bingham Greenebaum Doll LLP (57) ABSTRACT

A method, an apparatus, and a computer program for analyzing performance of a network application program are provided. The method for analyzing performance of a network application program which operates at a controller in a software defined networking (SDN) environment may include receiving identification information of the application program, flow information, and network configuration information of a network controlled by the controller, emulating a virtual network using the network configuration information, executing the virtual network using the flow information, measuring a time, when a virtual controller processes a flow, on a function basis, extracting information corresponding to the identification information of the application program from the measured result, and analyzing a performance degradation factor of the application program using the extracted information. According to an embodiment, a network manager automatically searches for a critical path and a hotspot using a conventional profiling scheme.

9 Claims, 6 Drawing Sheets

(51) Int. Cl.
*H04L 12/26* (2006.01)
*H04L 29/12* (2006.01)
(52) U.S. Cl.
CPC ............ *H04L 43/045* (2013.01); *H04L 43/14* (2013.01); *H04L 61/103* (2013.01); *H04L 41/12* (2013.01)

(56) References Cited

U.S. PATENT DOCUMENTS

| | | | | |
|---|---|---|---|---|
| 9,438,478 | B1* | 9/2016 | Amulothu | H04L 43/0894 |
| 9,450,866 | B2* | 9/2016 | He | H04L 45/64 |
| 9,467,378 | B1* | 10/2016 | Stark | H04L 45/745 |
| 9,584,369 | B2* | 2/2017 | Yin | H04L 41/12 |
| 9,729,582 | B2* | 8/2017 | Loo | H04L 63/20 |
| 9,876,704 | B2* | 1/2018 | Sun | H04L 43/0829 |
| 10,097,421 | B1* | 10/2018 | Rajagopal | H04L 41/20 |
| 2014/0337674 | A1* | 11/2014 | Ivancic | H04L 43/50 714/43 |
| 2015/0163152 | A1* | 6/2015 | Li | H04L 47/2441 370/409 |
| 2015/0277990 | A1* | 10/2015 | Xiong | G06F 9/52 718/106 |
| 2015/0372929 | A1* | 12/2015 | Rochwerger | H04L 45/38 709/238 |
| 2016/0156539 | A1* | 6/2016 | Savla | H04L 41/0816 370/252 |
| 2016/0269482 | A1* | 9/2016 | Jamjoom | H04L 67/1095 |
| 2016/0380874 | A1* | 12/2016 | Sun | H04L 43/0829 370/254 |
| 2017/0063599 | A1* | 3/2017 | Wu | H04L 41/064 |
| 2017/0093924 | A1* | 3/2017 | Loo | H04L 63/20 |
| 2017/0141987 | A1* | 5/2017 | Amulothu | H04L 43/0894 |
| 2017/0141988 | A1* | 5/2017 | Amulothu | H04L 43/0894 |
| 2017/0257324 | A1* | 9/2017 | Balmakhtar | H04L 43/08 |
| 2017/0264557 | A1* | 9/2017 | John | H04L 45/64 |
| 2017/0279760 | A1* | 9/2017 | Li | H04L 41/5009 |

OTHER PUBLICATIONS

Lantz, Bob, Brandon Heller, and Nick McKeown. "A network in a laptop: rapid prototyping for software-defined networks." Proceedings of the 9th ACM SIGCOMM Workshop on Hot Topics in Networks. ACM, 2010.*

Gelberger, Alexander, Niv Yennini, and Ran Giladi. "Performance analysis of software-defined networking (SDN)." Modeling, Analysis & Simulation of Computer and Telecommunication Systems (MASCOTS), 2013 IEEE 21st International Symposium on. IEEE, 2013.*

Sezer, Sakir, et al. "Are we ready for SDN? Implementation challenges for software-defined networks." IEEE Communications Magazine 51.7 (2013): 36-43.*

Tootoonchian, Amin, et al. "On Controller Performance in Software-Defined Networks." Hot-ICE 12 (2012): 1-6.*

Jungmin Son and 5 others, "CloudSimSDN: Modeling and Simulation of Software-Defined Cloud Data Centers", Cluster, Cloud and Grid Computing (CCGrid), 2015 15th IEEE/ACM International Symposium on (May 7, 2015) 2015.

Macro Canini and 3 others, "Automating the Testing of OpenFlow Applications", Proceedings of the 1st International Workshop on Rigorous Protocol Engineering (WRiPE) (Oct. 2011) 2011.

* cited by examiner

METHOD FOR ANALYZING PERFORMANCE OF NETWORK APPLICATION PROGRAM IN SOFTWARE DEFINED NETWORKING ENVIRONMENT, APPARATUS THEREFOR, AND COMPUTER PROGRAM THEREFOR

CROSS-REFERENCE TO RELATED APPLICATIONS

A claim for priority under 35 U.S.C. § 119 is made to Korean Patent Application No. 10-2016-0049900 filed Apr. 25, 2016, in the Korean Intellectual Property Office, the entire contents of which are hereby incorporated by reference.

BACKGROUND

Embodiments of the inventive concepts described herein relate to a method for analyzing performance of a network application program, an apparatus therefor, and a computer program therefor, and more particularly, relate to a method for analyzing performance of a network application program which operates at a controller in a software defined networking (SDN) environment.

SDN may refer to technology in which an intelligent central management system manages all network equipment of a network. A variety of functions may be developed and assigned in the SDN as compared with a conventional network structure by processing, by a controller provided in the form of software, a control operation associated with processing packets, performed in conventional network equipment of a hardware form.

In general, an SDN system may include a controller for controlling the entire network, a plurality of OpenFlow switches for being controlled by a controller server and processing packets, and a host corresponding to a lower layer of the OpenFlow switches. In this case, each of the OpenFlow switches may be responsible for only a transmission and reception function of packets, and path establishment, management, and control of packets may be achieved by the controller. In other words, to divide a data plane and a control plane configuring network equipment may be a basic structure of the SDN system.

The SDN may be represented as a 3-layer structure configured with an infrastructure layer, a control layer, and an application program layer. A data transmitter for performing L0 to L3 switch functions may be located in the infrastructure layer. A network controller for controlling a network operation using a global view for the entire network state and an application program for operating in an upper level may be located in the control and application program layers, respectively. Southbound interfaces and northbound interfaces may exist for interworking between layers. An SDN application program layer may include all types of application programs and services which accesses a network function provided from an SDN control layer via a northbound application programming interface (API).

In this case, since a flow rule for controlling a network is transmitted from an application program, performance of the entire network may be greatly influenced by performance of the application program. For example, if the application program quickly generates the flow rule, since this means that a flow is quickly processed, the performance of the entire network may be increased.

As such, although the performance of the application program is very important in an SDN environment, there is no method for analyzing the performance of the application program and optimizing the performance of the application program.

Since the application program in the SDN environment differs in purpose and function from a conventional application program and since it has a great difference in performance based on a size of a network or the number of packets due to characteristics of a network program, it is difficult to apply profiling technology well known as a general method for analyzing performance of an application program to an analysis of performance of a network application program without change and it takes a long time to analyze the performance of the network application program.

SUMMARY

Embodiments of the inventive concepts provide a method for analyzing performance of a network application program to simply analyze performance as compared with the related art and shorten a time taken to analyze performance by automatically searching for a critical path and a hot spot using a conventional profiling scheme, an apparatus therefor, and a computer program therefor.

Embodiments of the inventive concepts provide a method for analyzing performance of a network application program to easily increase network performance by conveniently managing performance of an application program in view of a user and have high availability, an apparatus therefor, and a computer program therefor.

According to an aspect of an embodiment, a method for analyzing performance of a network application program which operates at a controller in a software defined networking (SDN) environment may include receiving identification information of the application program, flow information, and network configuration information of a network controlled by the controller, emulating a virtual network using the network configuration information, executing the virtual network using the flow information, measuring a time, when a virtual controller processes a flow, on a function basis, extracting information corresponding to the identification information of the application program from the measured result, and analyzing a performance degradation factor of the application program using the extracted information.

According to another aspect of an embodiment, an apparatus for analyzing performance of a network application program which operates at a controller in an SDN environment may include an interface unit configured to receive identification information of the application program, flow information, and network configuration information of a network controlled by the controller, an emulator configured to emulate a virtual network using the network configuration information, a control unit configured to execute the virtual network using the flow information, a profiling unit configured to measure a time, when a virtual controller processes a flow, on a function basis, and an analysis unit configured to extract information corresponding to the identification information of the application program from the measured result and analyze a performance degradation factor of the application program using the extracted information.

According to another aspect of an embodiment, a computer program stored in a medium to analyze performance of a network application program which operates at a controller in an SDN environment may include receiving identification information of the application program, flow information, and network configuration information of a network controlled by the controller, emulating a virtual network using the network configuration information, executing the virtual network using the flow information, measuring a time, when a controller of the virtual network processes a flow, on a function basis, extracting information corresponding to the identification information of the application program from the measured result, and analyzing a performance degradation factor of the application program using the extracted information.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

The above-mentioned purposes, features, and advantages will be described in detail with reference to the accompanying drawings. Therefore, those skilled in the art may easily implement the scope and spirit of the inventive concept. In describing the inventive concept, if it is determined that a detailed description of well-known technology associated with the inventive concept may blurs the gist of the inventive concept, the detailed description will be omitted. Hereinafter, a detailed description will be given of exemplary embodiments of the inventive concept with reference to the accompanying drawings. In the drawings, the same reference denotations may be used to indicate the same or similar elements.

A flow in the specification may refer to a set or flow of packets passing through a specified viewing point on a network during a specific time. A flow in a controller may be a control message transmitted and received between the controller and a switch. A flow in the entire network may refer to a packet exchanged in the network or a flow of the packet.

A "network topology" in the specification may be a network configuration form and may mean a shape in which nodes configuring a network are connected and a scheme, form, and shape which interconnects by a link.

A "call graph" in the specification is usually called a function call graph and may refer to a graph indicating a function call relation in a computer program. The call graph may be configured with nodes, and each of the nodes may mean a function or method.

Figure 1:
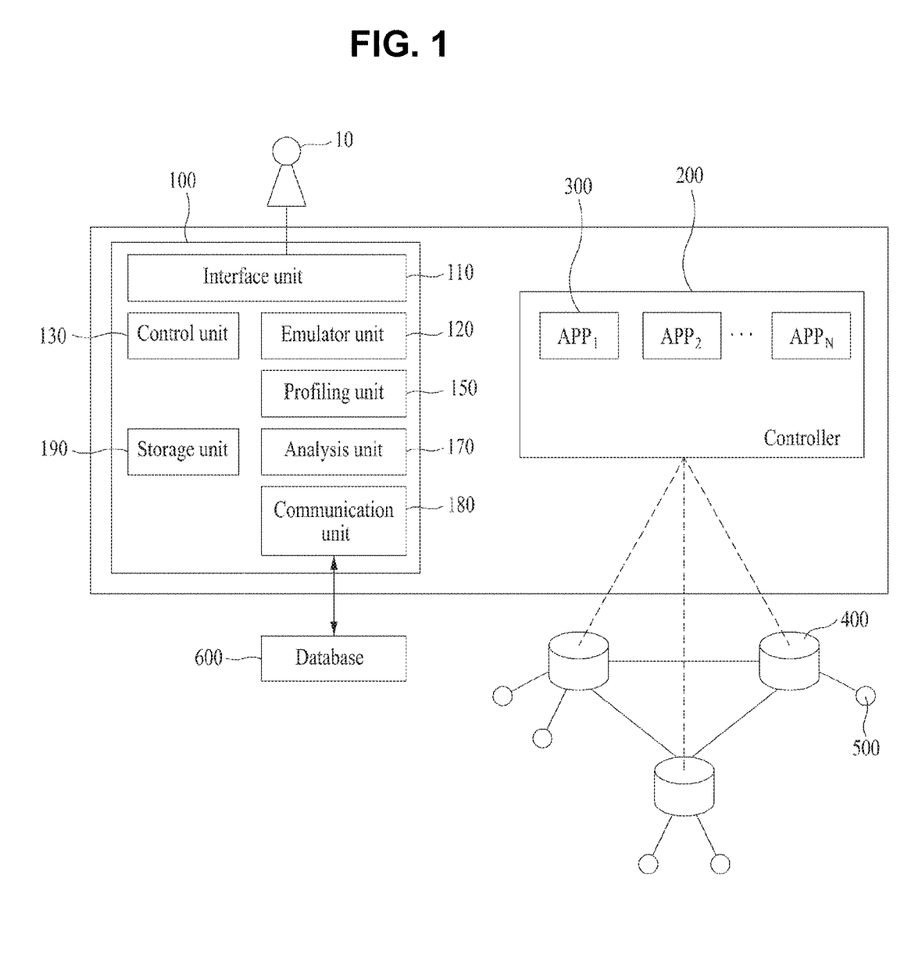
FIG. 1 is a conceptual diagram illustrating a software defined networking (SDN) environment and an apparatus for analyzing performance of a network application program according to an embodiment.
Figure 2:
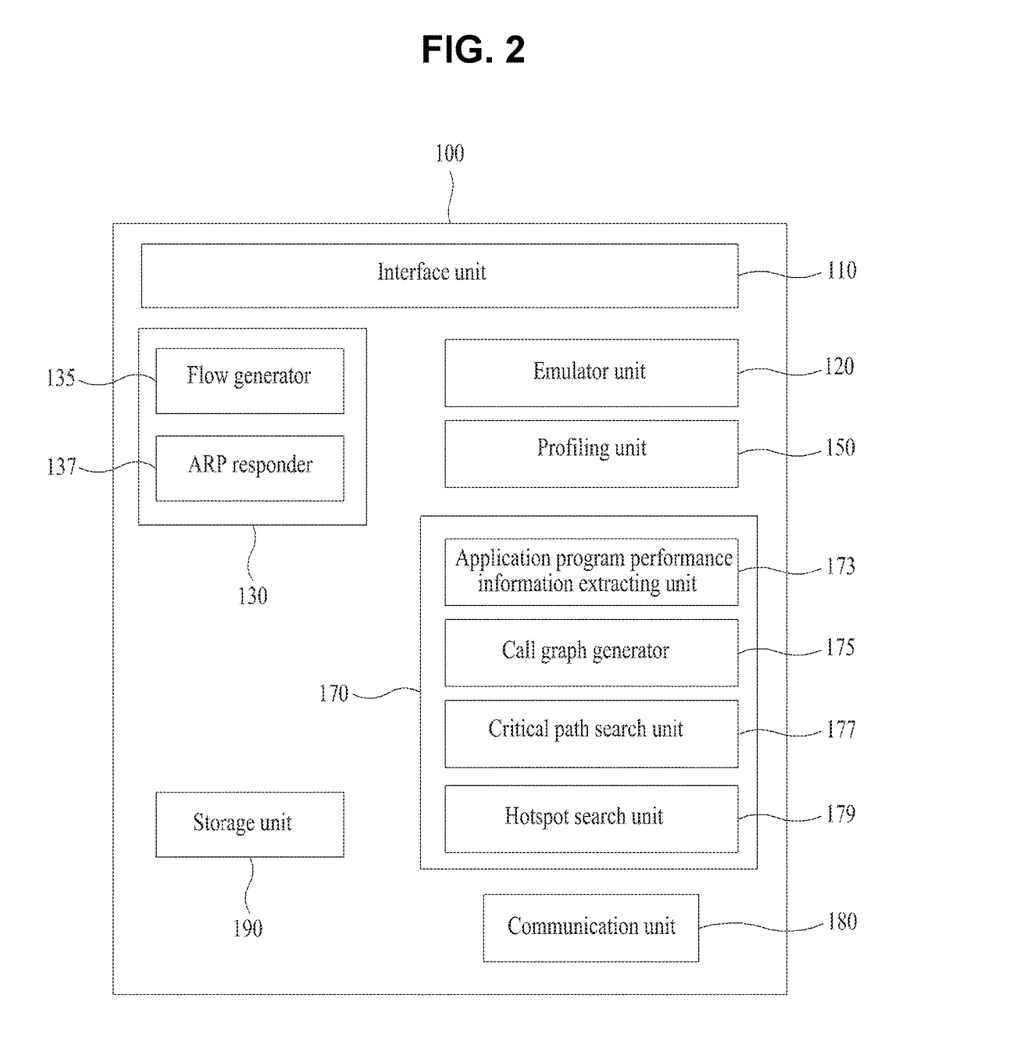
FIG. 2 is a block diagram more particularly illustrating a configuration of an apparatus for analyzing performance of a network application program according to an embodiment.

Hereinafter, a description will be given of an apparatus for analyzing performance of a network application program according to an embodiment with reference to FIGS. 1 and 2. FIG. 1 is a conceptual diagram illustrating a software defined networking (SDN) environment and an apparatus for analyzing performance of a network application program according to an embodiment. FIG. 2 is a block diagram more particularly illustrating a configuration of an apparatus for analyzing performance of a network application program according to an embodiment.

Referring to FIG. 1, the SDN environment according to an embodiment may include an apparatus 100 for analyzing performance of a network application program 100 (hereinafter referred to as "performance analysis apparatus 100"), a controller 200, a network application program 300, network equipment 400, a host 500, and a database 600. Each of the network equipment 400 and the host 500 may be referred to as a node. A link may refer to a connection between two nodes. In this case, the performance analysis apparatus 100 and the controller 300 according to an embodiment may be included together in controller equipment.

The controller 200 may control the entire network including the network equipment 400 and the host 500 and may be implemented in the form of loading software which performs functions such as topology management of the network, path management associated with processing a packet, link discovery, and flow management.

The network application program 300 may be software which generates a flow rule for controlling a network and may provide a variety of functions to a user 10 using an application programming interface (API) provided from the controller 200.

The network equipment 400 may perform a function of processing a packet based on control of the controller 200. The network equipment 400 may be, for example, a base transceiver station (BTS), a base station controller (BSC), gateway equipment, a switch of a wired network, a router, or the like. The most common network equipment 400 used in an SDN may be an OpenFlow switch 400. It may be understood that the network equipment 400 includes a switch for supporting only an OpenFlow protocol, a virtual switch for supporting the OpenFlow protocol, and a general L2 switch for supports the OpenFlow protocol.

The host 500 may refer to a terminal or the like corresponding to a lower layer of the switch 400 and may be used as a meaning of being collectively a client and a server. The host 500 may generate a packet to be transmitted to another host over the SDN and may transmit the packet to the switch 400 through a port of a network interface.

The database 600 may be an external database which stores the result of analyzing performance of the network application program 300 and performance analysis information. A plurality of network managers may share and update performance analysis information through the database 600. All types of databases accessible through a communication network may be used as the database 600.

Referring to FIGS. 1 and 2, the performance analysis apparatus 100 according to an embodiment may include an interface unit 110 for receiving information necessary for analyzing performance of an application program from the user 10, an emulator unit 120, a control unit 130, a profiling unit 150, and an analysis unit 170. The performance analysis apparatus 100 may further include a communication unit 180 and a storage unit 190.

The interface unit 110 may receive identification information of an application program, flow information, and network configuration information of a network controlled by the controller 200 from the user 10 and may provide performance analysis information to the user 10. Further, the interface unit 110 may provide a graphic interface to the user 10.

Herein, the network configuration information may include identification information of the controller 200, network topology information, and network size information. The flow information may include a setting value for the number of control messages per unit time, received at the controller 200. The flow information and the network configuration information received from the user 10 may be used to emulate and execute a virtual network. The user 10 may verify the result of analyzing performance of a network and performance analysis information associated with the result by inputting only some network configuration information via the performance analysis device 100 according to an embodiment.

The identification information of the controller 200 may refer to identification information of a controller used by a network application program having performance the user 10 wants to measure. The network topology information may be information about a form of a network and link configuration. The network size information may be information about the number of nodes configuring the network. In addition, the network configuration information may include a network state, a performance measurement time, the number of times performance is repeatedly measured, the number of flows in the network, and the like.

The emulator unit 120 may emulate the virtual network using the network configuration information. Also, the emulator unit 120 may manage network emulators and may automatically emulate the virtual network based on a script using an API provided from an emulator and the network configuration information input from the user 10. In other words, the emulator unit 120 may automatically set up an environment of the virtual network by using the network configuration information as an input variable such that the user 10 easily configures the virtual network.

For example, if the user 10 inputs network topology information and network size information, the emulator unit 120 may configure a virtual network having a size and form and may set up the same environment.

The control unit 130 may execute the virtual network using the flow information. In detail, the control unit 130 may include a flow generator 135 and an address resolution protocol (ARP) responder 137.

If the virtual network is established, the control unit 130 may connect the controller 200 with the virtual network. The flow generator 135 may generate flow information in the controller 200, that is, may generate a flow in the virtual network to transmit a control message corresponding to a setting value for the number of control messages per unit time. Herein, the flow may mean a flow of a packet transmitted and received between nodes configuring a network. The flow generator 135 may transmit an ARP request packet for determining a medium access control (MAC) address of a packet destination before transmitting a packet. The ARP responder 137 may transmit an ARP response packet corresponding to the ARP request packet.

As such, the control unit 130 may generate the flow in the virtual network such that the performance analysis apparatus 100 may collect information necessary for measuring performance of an application program. In addition, the control unit 130 may extract instructions or input variables necessary for processing of each module from the network configuration information received via the interface unit 110 and may transmit the instructions or input variables to each module, playing a role in managing a module in the performance analysis apparatus 100.

The profiling unit 150 may measure a time when the controller 200 processes a flow, on a function basis using a profiling tool. The profiling unit 150 may collect program events of application programs $APP_1$ to $APP_N$ 300 in the controller 200 and may measure latency of each of the application programs $APP_1$ to $APP_N$ 300, resource usage of each of the application programs $APP_1$ to $APP_N$ 300, use of a specific instruction, a call period and frequency of a function, and the like on a function or method basis. A flat profiler, a call-graph profiler, an input-sensitive profiler, or the like may be used as the profiling tool. However, the profiling unit 150 according to an embodiment is not limited to a type of a profiler. Measurement result data of the profiling unit 150 may be stored as an extensible markup language (XML) file in the storage unit 190.

The analysis unit 170 may extract information corresponding to identification information of the application program 300 from the measured result and may analyze a performance degradation factor of the application program 300 using the extracted information. In detail, as shown in FIG. 2, the analysis unit 170 may include an application program performance information extracting unit 173, a call graph generator 175, a critical path search unit 177, and a hotspot search unit 179. If he measurement result data of the profiling unit 150 is stored as an XML file in the storage unit 190, the analysis unit 170 may analyze the stored XML file.

The application program performance information extracting unit 173 may remove a node including a keyword from a call graph of the controller 200, generated as a result of the measurement and may extract a function call path corresponding to the identification information of the application program 300 from the removed result. The measurement result data of the profiling unit 150 may be a call graph for the entire controller 200 rather than information about a separate application program. Thus, the application program performance information extracting unit 173 may extract only a call graph corresponding to a target application program having performance the user 10 wants to analyze, that is, an application program corresponding to application program identification information input via the interface unit 110.

Herein, since unnecessary nodes are also included in the call graph of the controller 200, the application program performance information extracting unit 173 may preset a keyword included in functions irrespective of real performance of the application program 300 and may remove a node including the keyword. For example, since nodes in which "java" is included in a function name are functions frequently called when the controller 200 is operated, but since the nodes are about a java platform and are unrelated to performance of the application program 300, these nodes may be omitted. The application program performance information extracting unit 173 may extract a function call path corresponding to identification information of a target application program having performance to be analyzed among the remaining nodes, thus filtering information associated with the application program.

The call graph generator 175 may generate a sub-call graph, that is, an application program call graph using information corresponding to identification information of the application program 300. Herein, if the measurement result provided from the profiling unit 150 is provided in the form of a call graph, since a sub-call graph is automatically generated as a result of deleting and extracting a node, in this case, it may be unnecessary to generate a separate call graph.

A critical path search unit 177 may search for a critical path where it takes the longest flow processing time in the application program call graph. In detail, the critical path search unit 177 may set a root node of the application program call graph to a start node. If there are a plurality of child nodes in a lower level of the start node, the critical path search unit 177 may compare total time values of the child nodes. The critical path search unit 177 may designate a child node having the largest total time value as a result of the comparison as a critical path configuration node and may set the critical path configuration node to a start node. The critical path search unit 177 may search for the critical path by repeating the comparing of total time values of child nodes, the designating as a critical path configuration node, and the setting to a start node, until there are no a plurality of child nodes in a lower level. Herein, the total time value may be one of values measured by the profiling unit 150. A total time value of a specific node may be the sum of a unique processing time value of the specific node and unique processing time values of nodes which exist in a lower level of the specific node. For example, when there are node B and node C in a lower level of node A, a total time value of node A may refer to a value obtained by adding all of a unique processing time value of node A, a unique processing time value of node B, and a unique processing time value of node C.

The hotspot search unit 179 may search for a hotspot where it takes the longest flow processing time in the critical path. In detail, the hotspot search unit 179 may compare unique processing time values of functions included in the critical path and may set a function having the highest unique processing time value as a result of the comparison to a hotspot. The unique processing time value may mean a time taken to process a function of the node itself.

The communication unit 180 may transmit a query about whether there is performance analysis information corresponding to the analyzed result in the database 600. If information corresponding to the query is stored in the database 600, the communication unit 180 may receive the performance analysis information from the database 600. In detail, the communication unit 180 may transmit a query about whether there is information about a critical path or a hotspot associated with a target application program having performance to be analyzed in the database 600. Further, the user 10 may share the information about the critical path or the hotspot, stored in the database 600, via the communication unit 180. This may allow a plurality of users who use the target application program having performance to be analyzed to share a problem of the application program and a method of enhancing the application program such that the user 10 may easily enhance performance of the application program and easily discover a problem without a separate performance analysis.

Hereinafter, a description will be given of a method for analyzing performance of a network application program according to an embodiment and a computer program stored in a medium to execute each of operations of the method for analyzing the performance of the network application program with reference to FIGS. 3 to 7.

Figure 3:
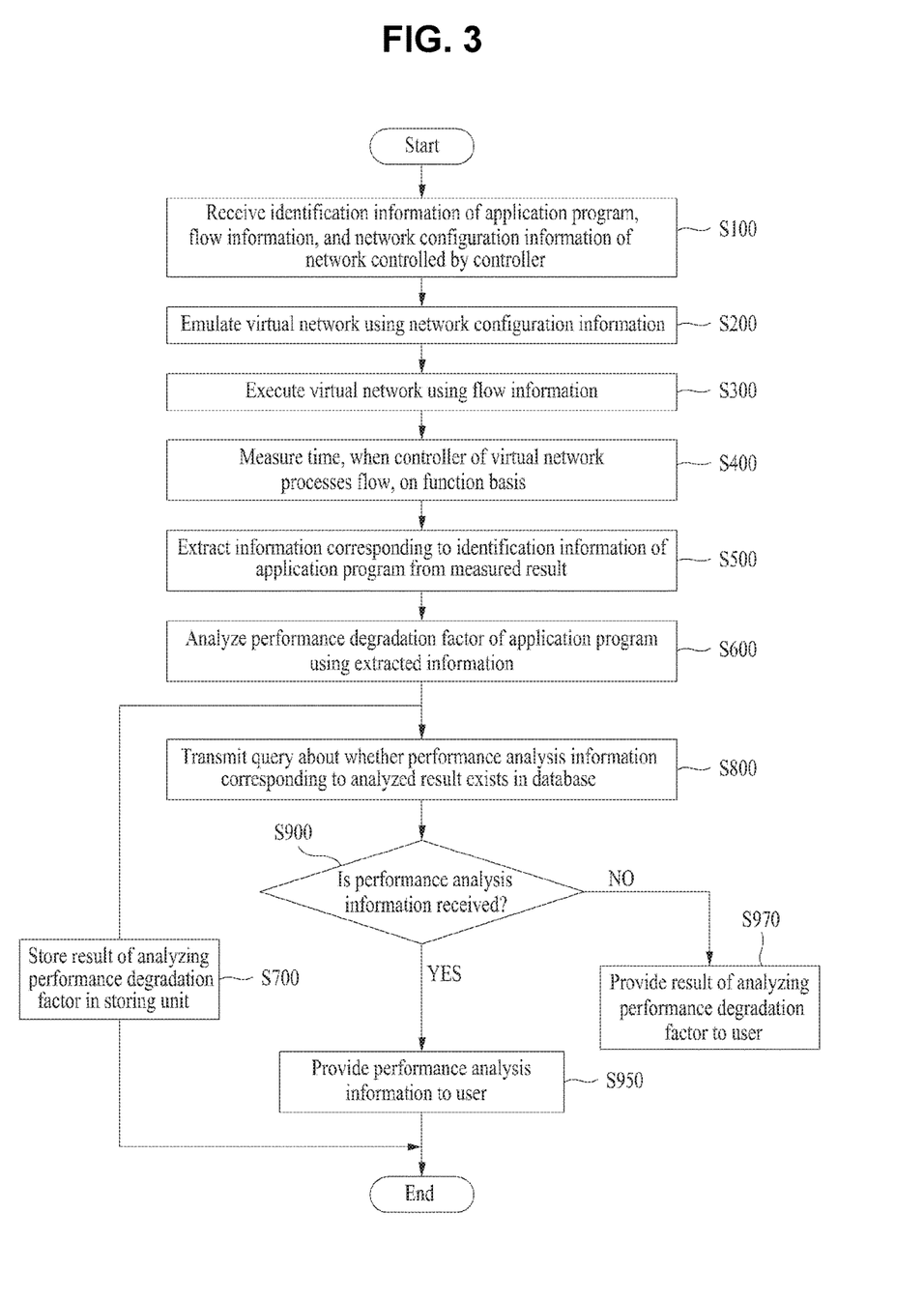
FIG. 3 is a flowchart illustrating a method for analyzing performance of a network application program according to an embodiment.

First of all, FIG. 3 is a flowchart illustrating a method for analyzing performance of a network application program according to an embodiment. Referring to FIG. 3, in the method for analyzing the performance of the network application program according to an embodiment, in operation S100, identification information of the application program, flow information, and network configuration information of a network controlled by a controller may be received. In operation S200, a virtual network may be emulated using the network configuration information. In operation S300, the virtual network may be executed using the flow information. In operation S400, a time when a controller of the virtual network processes a flow may be measured on a function basis. The measured result may be stored as an XML file. In operation S500, information corresponding to the identification information of the application program may be extracted from the measured result. In operation S600, a performance degradation factor of the application program may be analyzed using the extracted information. In operation S700, the result of analyzing the performance degradation factor may be stored in a storage unit. In operation S800, a query about whether performance analysis information corresponding to the analyzed result exists in a database may be transmitted. If the performance analysis information corresponding to the query is received from the database in operation S900, in operation S950, the performance analysis information may be provided to a user. Since there is no the performance analysis information corresponding to the query in the database, if any information is not received, in operation S970, the result of analyzing the performance degradation factor may be provided to the user. Also, although not illustrated, if the analyzing of the performance degradation factor in operation S600 is completed, the result of analyzing the performance degradation factor may be immediately provided to the user.

The network configuration information received from the user in operation S100 may include identification information of the controller, network topology information, and network size information. Further, the network configuration information may further include a network state, a performance measure time, the number of times performance is repeatedly measured, the number of flows in a network, and the like. For example, when the user wants to analyze performance of an application program which operates on a secure-mode open networking operating system (ONOS) controller, the identification information of the controller may include information indicating that the controller is the ONOS controller. The user may input the number of switches as a size of a network managed by the secure-mode ONOS controller. If there are 4 switches and 8 switches, when the user wants to measure performance twice, the user may additionally input the number of times of repetition of two times. Further, the user may input topology information of the network managed by the secure-mode ONON controller among a variety of network topologies such as a ring topology, a mesh topology, a tree topology, a line topology, and a bus topology. If the user wants to establish a virtual network using a tree topology having 4 switches, in operation S200, the virtual network may be emulated using the network configuration information input from the user.

Further, the flow information may be received from the user in operation S100. The flow information may include a setting value for the number of control messages per unit time, received at a virtual controller. In this case, in operation S300, the virtual network may be executed by generating a flow in the virtual network to transmit a control message corresponding to the setting value for the number of the control messages per unit time to the controller.

Figure 4:
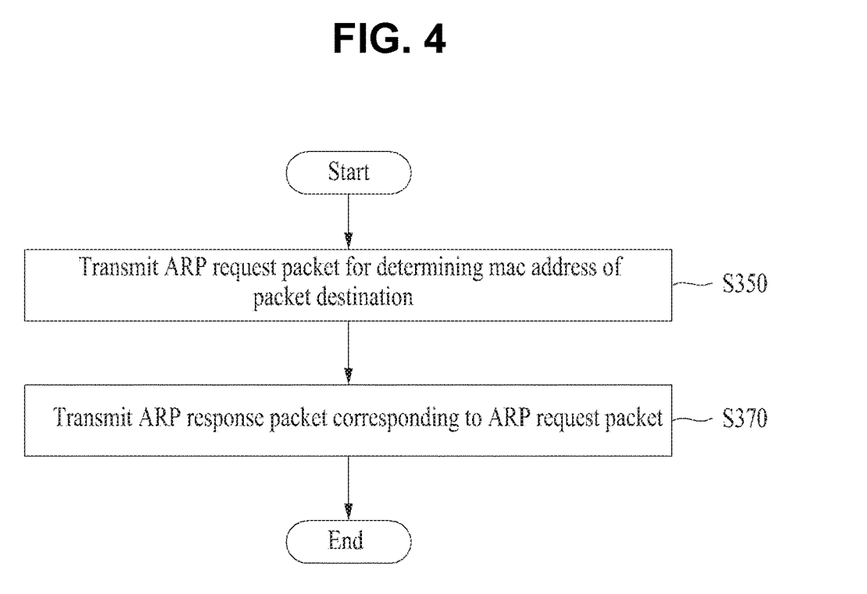
FIG. 4 is a flowchart particularly illustrating an operation of executing a virtual network according to an embodiment.

Referring to FIG. 4 which is a flowchart particularly illustrating operation S300 of executing the virtual network according to an embodiment, in operation S350, an ARP request packet for determining a MAC address of a packet destination may be transmitted in operation S300 of executing the virtual network. In operation S370, a flow may be generated by transmitting an ARP response packet corresponding to the ARP request packet.

Figure 5:
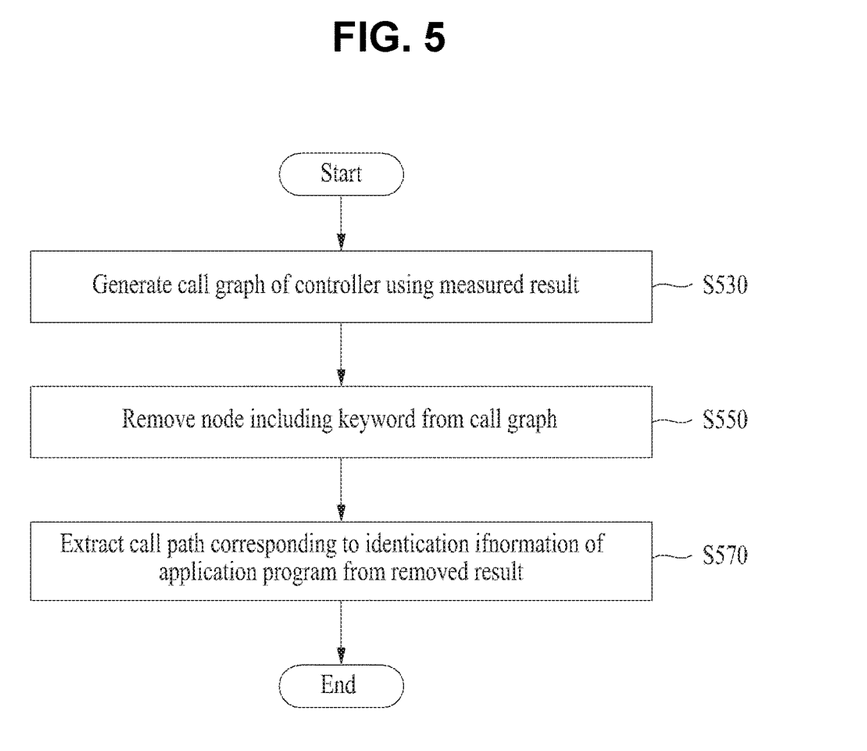
FIG. 5 is a flowchart particularly illustrating an operation of extracting information corresponding to identification information of an application program according to an embodiment.

A description will be given in detail of operation S500 of extracting the information corresponding to the identification information of the application program with reference to FIG. 5. Referring to FIG. 5, operation S500 of extracting the information corresponding to the identification information of the application program may be achieved through operation S530 of generating a call graph of the controller using the measured result, operation S550 of removing a node including a keyword from the call graph, and operation S570 of extracting a call path corresponding to the identification information of the application program from the removed result. If the result measured in operation S400 is output as a call graph, operation S530 of generating the call graph of the controller may be omitted. Operation S550 may be called when a flow of the controller is processed and may be for removing functions irrespective of executing an application program. The user may obtain a call graph for a target application program having performance to be analyzed by removing a node irrespective of executing the application program from the call graph and extracting the call path corresponding to the identification information of the application program in operation S570.

Figure 6:
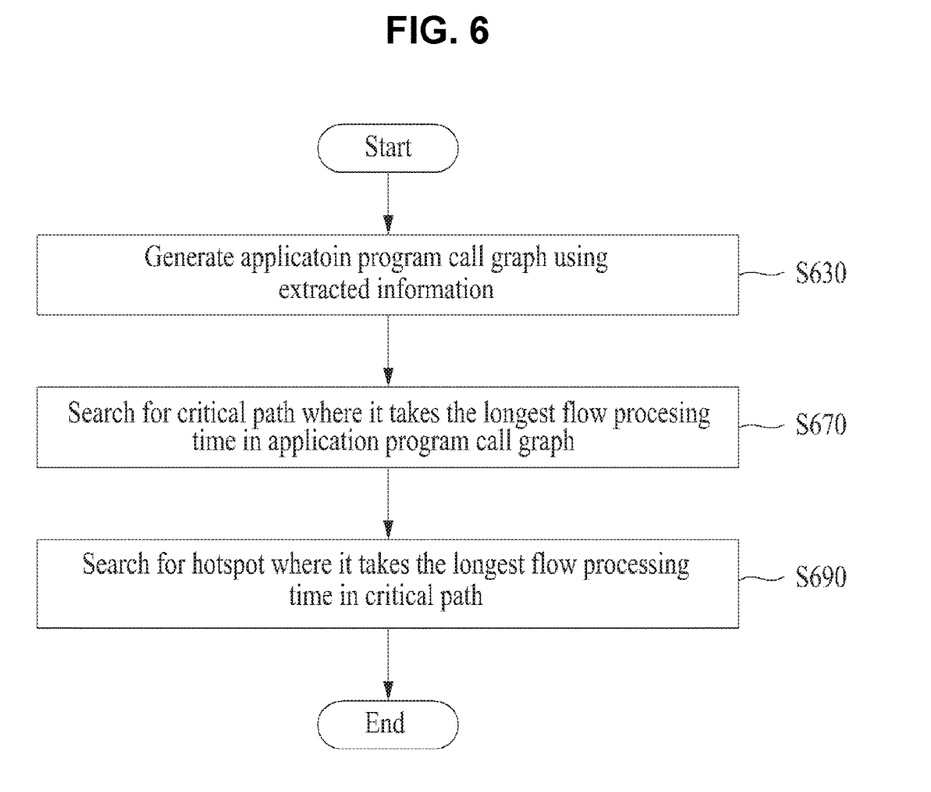
FIG. 6 is a flowchart particularly illustrating an operation of analyzing a performance degradation factor of an application program according to an embodiment.

A description will be given in detail of operation S600 of analyzing the performance degradation factor of the application program according to an embodiment with reference to FIG. 6. Operation S600 of analyzing the performance degradation factor of the application program may be achieved through operation 630 of generating an application program call graph using the extracted information, operation S670 of searching for a critical path where it takes the longest flow processing time in the application program call graph and operation S690 of searching for a hotspot where it takes the longest flow processing time in the critical path. In this case, if the information extracted in operation S500 is output as a call graph, operation S630 may be omitted.

Figure 7:
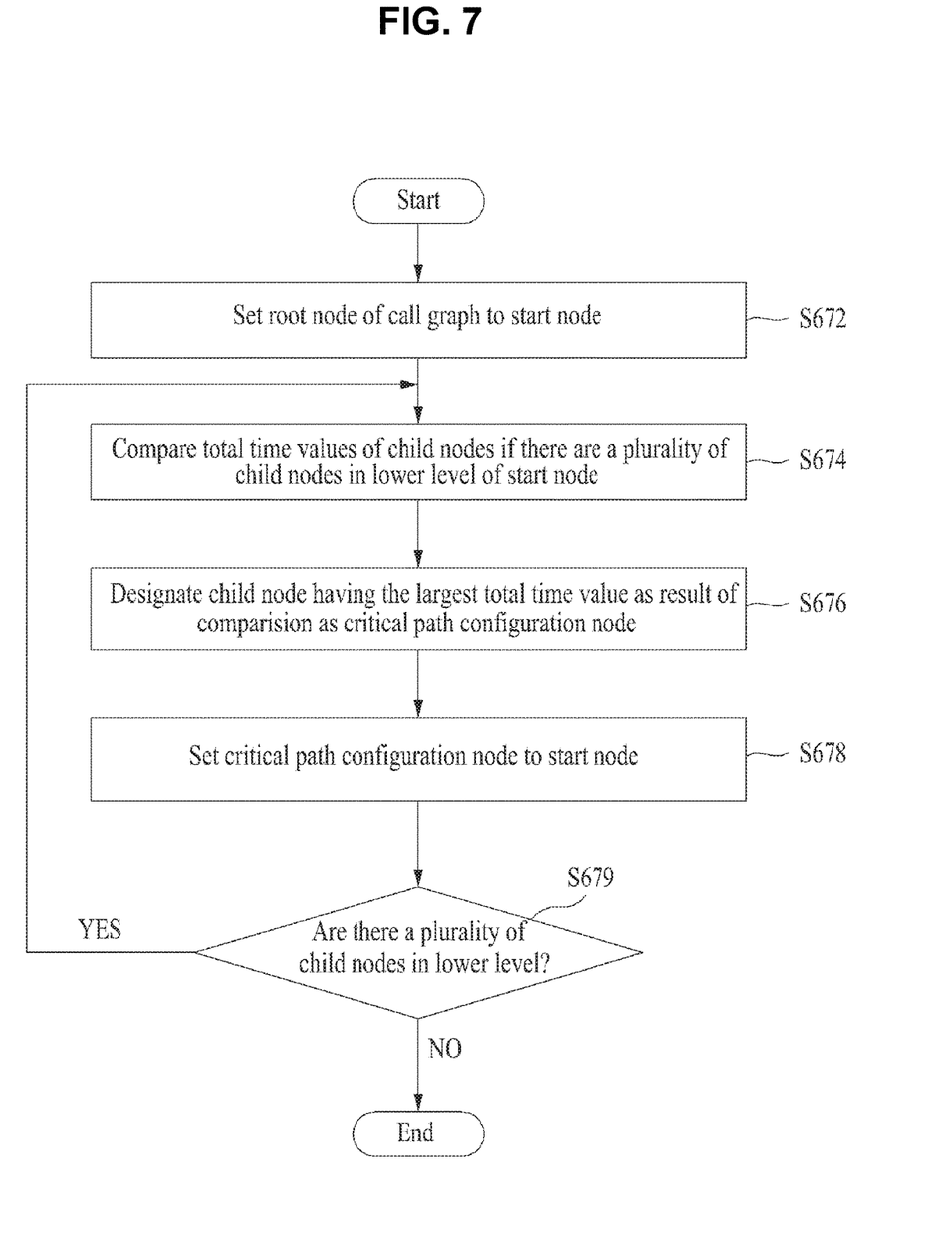
FIG. 7 is a flowchart particularly illustrating an operation of searching for a critical path according to an embodiment.

A description will be given in detail of operation S670 of searching for the critical path according to an embodiment with reference to FIG. 7. First of all, in operation S672, a root node of the application program call graph may be set to a start node. In operation S674, if there are a plurality of child nodes in a lower level of the start node, total time values of the child nodes may be compared with each other. In operation S676, a child node having the largest total time value as a result of the comparison may be designated as a critical path configuration node. In operation S678, the critical path configuration node may be set to a start node. In operation S679, it may be determined whether there are a plurality of child nodes in a lower level. Operations S674, S676, and S678 may be repeated until there are no the plurality of child nodes in the lower level. If there are no the plurality of child nodes in the lower level, a child node of the lower level may be connected with the nodes designated as the critical path configuration node through the above-mentioned operations, and the connected path may be set to the critical path. Thus, operation S670 of searching for the critical path may be ended.

If the searching and setting of the critical path is completed, operation 690 of searching for the hotspot in the critical path may be performed. This may be performed through a method for setting a function having the highest unique processing time value among functions included in the critical path to the hotspot.

It is noted that each of embodiments in the description about the performance analysis method, the performance analysis apparatus 100, and the computer program is applied to another method, another apparatus, and another computer program in the same manner.

As described above, an embodiment may simply analyze performance as compared with the related art and may shorten a time taken to analyze performance as a network manager automatically searches for a critical path and a hotspot using a conventional profiling scheme.

An embodiment may increase convenience and availability of network performance management by conveniently managing performance of an application program in view of the user.

Those skilled in the art will appreciate that various modifications, additions, and substitutions are possible, without departing from the technical scope of the inventive concept. Therefore, embodiments of the inventive concept do not intend to limit the scope of the inventive concept by the above-mentioned embodiments and the accompanying drawings.

What is claimed is:

1. A method for analyzing performance of a network application program which operates at a controller in a software defined networking (SDN) environment, the method comprising:
receiving identification information of the application program, flow information, and network configuration information of a network controlled by the controller;
emulating a virtual network using the network configuration information;
executing the virtual network using the flow information;
measuring a time, when a virtual controller processes a flow, on a function basis;
extracting information corresponding to the identification information of the application program from the measured result; and
analyzing a performance degradation factor of the application program using the extracted information.

2. The method of claim 1, wherein the network configuration information comprises identification information of the controller, network topology information, and network size information.

3. The method of claim 1, wherein the flow information comprises a setting value for the number of control messages per unit time, received by the virtual controller, and
wherein the executing of the virtual network comprises:
generating a flow in the virtual network to transmit a control message corresponding to the setting value to the virtual controller.

4. The method of claim 3, wherein the generating of the flow comprises:
transmitting an address resolution protocol (ARP) request packet for determining a medium access control (MAC) address of a packet destination; and
transmitting an ARP response packet corresponding to the ARP request packet.

5. The method of claim 1, wherein the extracting of the information corresponding to the identification information of the application program comprises:
generating a call graph of the controller using the measured result;
removing a node including a keyword from the call graph; and extracting a call path corresponding to the identification information of the application program from the removed result.

6. The method of claim 1, wherein the analyzing of the performance degradation factor of the application program comprises:

generating an application program call graph using the extracted information;

searching for a critical path where it takes the longest flow processing time in the application program call graph; and searching for a hotspot where it takes the longest flow processing time in the critical path.

7. The method of claim 6, wherein the searching of the critical path comprises:

setting a root mode of the application program call graph to a start node;

if there are a plurality of child nodes in a lower level of the start node, comparing total time values of the child nodes;

designating a child node having the largest total time value as a result of the comparison as a critical path configuration node;

setting the critical path configuration node to a start node; and repeating the comparing of the total time values of the child nodes, the designating as the critical path configuration node, and the setting to the start node, until there are no a plurality of child nodes in a lower level.

8. The method of claim 6, wherein the searching of the hotspot comprises:

setting a function having the highest unique processing time value among functions included in the critical path to the hotspot.

9. The method of claim 1, further comprising:

transmitting a query about whether there is performance analysis information corresponding to the analyzed result in a database; and if the performance analysis information is received from the database, providing the performance analysis information to a user.

* * * * *